UNITED STATES PATENT OFFICE.

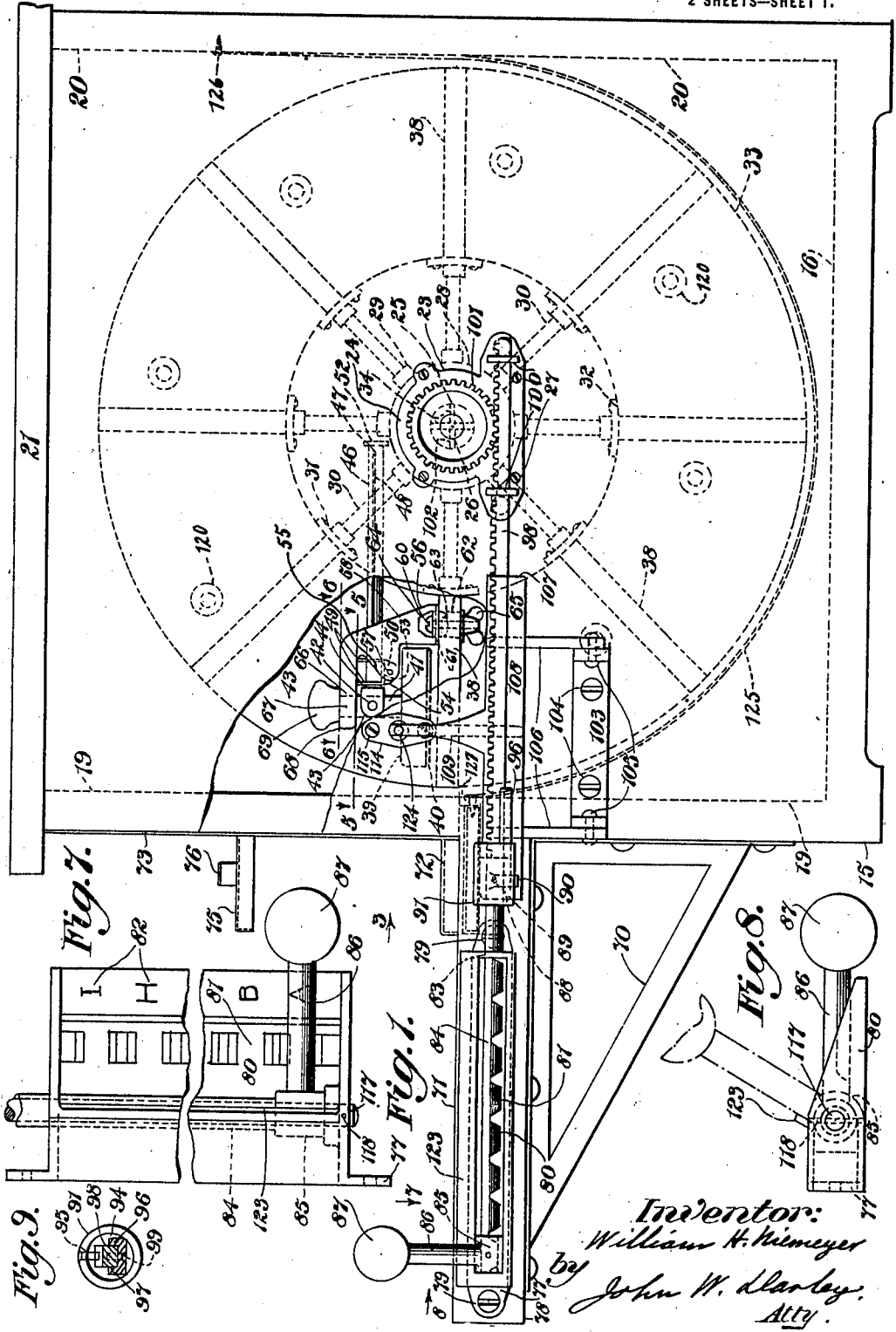

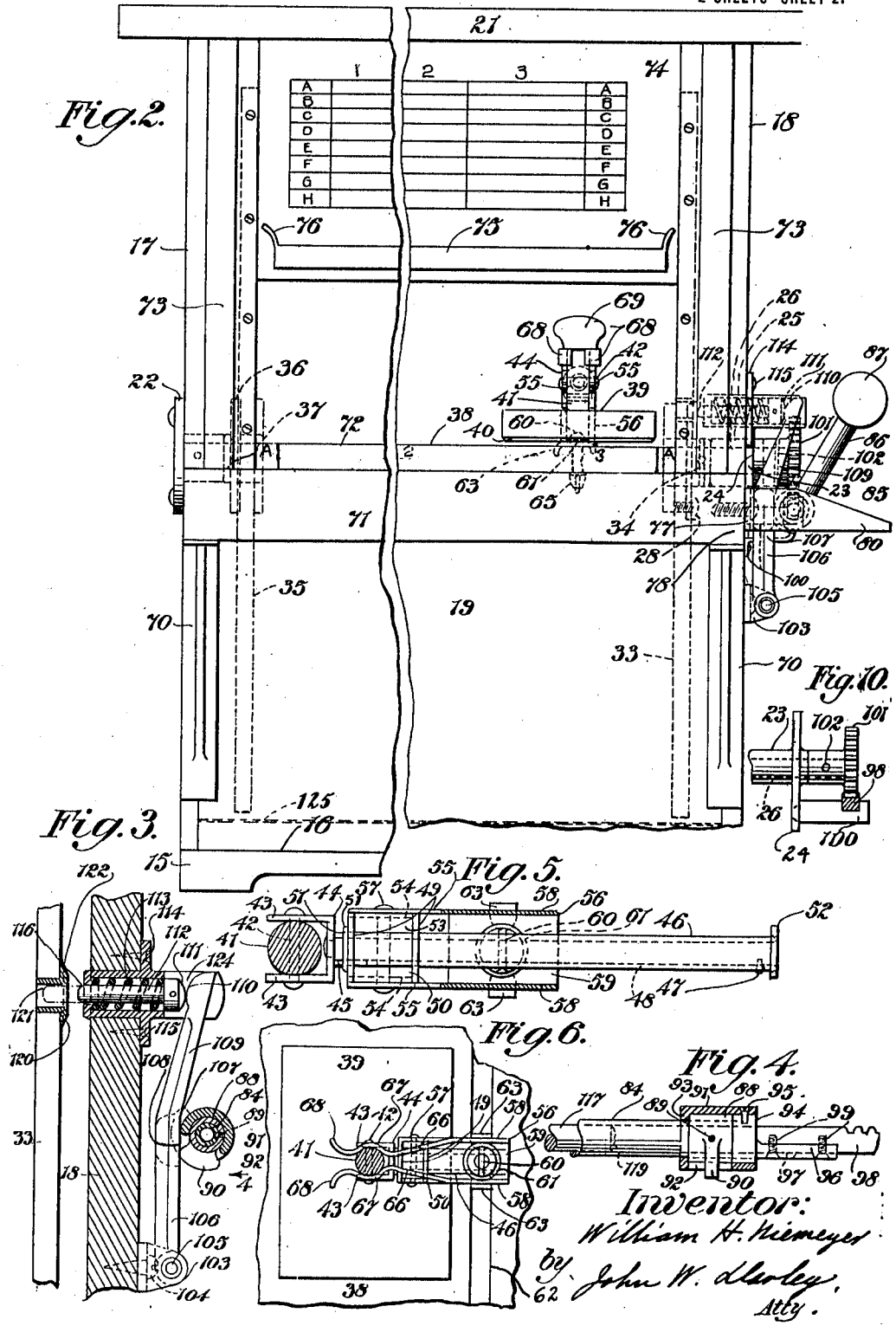

WILLIAM H. NIEMEYER, OF BALTIMORE COUNTY, MARYLAND.

STAMP-RACK.

1,314,893. Specification of Letters Patent. Patented Sept. 2, 1919.

Application filed September 18, 1917. Serial No. 191,913.

*To all whom it may concern:*

Be it known that I, WILLIAM H. NIEMEYER, a citizen of the United States, residing in the county of Baltimore and State of Maryland, have invented certain new and useful Improvements in Stamp-Racks; and I do hereby declare the following to be a full, clear, and exact description of the invention, such as will enable others skilled in the art to which it appertains to make and use the same.

My invention relates to stamp racks.

One object of my invention is to provide a rack capable of supporting a plurality of stamps and combined with a hand-operating mechanism which also acts as a stopping mechanism and a visual index, so that any one of said plurality of stamps can be readily moved to and stopped in the position for use.

Another object of my invention is to provide a case for said rack so that the rack can be completely closed when not in use to prevent the accumulation of dust upon the stamps and co-acting mechanism.

These and further objects of my invention are fully described and explained in the following specification, reference being had to the accompanying drawings wherein:—

Figure 1 is a side view of my improved stamp rack, part of the case being broken away to show one of the shelves for supporting the stamps and one of the stamps mounted thereon.

Fig. 2 is a front view of my improved stamp rack, the middle portion thereof being broken away.

Fig. 3 is an enlarged detail view of my improved indexing mechanism, partly in section, when viewed in the direction of the arrow 3 in Fig. 1.

Fig. 4 is an enlarged detail view, partly in section, of certain of the parts shown in Fig. 3, when viewed in the direction of the arrow 4.

Fig. 5 is an enlarged section of my improved stamp support and coöperating parts, taken along the line 5—5 of Fig. 1, looking in the direction of the arrows.

Fig. 6 is a section along the line 6—6 of Fig. 1 looking in the direction of the arrows.

Fig. 7 is a view of the index bracket when looking in the direction of the arrow 7 in Fig. 1.

Fig. 8 is a view of the index bracket when looking in the direction of the arrow 8 in Fig. 1.

Fig. 9 is a detail of parts hereinafter referred to.

Fig. 10 is a detail of parts hereinafter referred to.

In the drawings:

15 represents a casing which is formed with a bottom 16, sides 17 and 18, a front 19, a back 20 and a top 21; these parts may be formed of wood, metal or any suitable composition and joined together in any approved way.

Near the center of the side 17, a bearing stud 22 is secured in any approved manner and a bearing 23 is secured on the side 18 in line with the bearing stud 22.

The bearing 23 has a flange 24 formed integrally with the boss 25 and said flange and boss are provided with a central hole therethrough in which is revolubly mounted the shaft 26. The flange 24 is secured to the side 18 by screws such as 27. The shaft 26 fits tightly within a hole provided within the flange 28 and said flange is provided with a plurality of bosses 29 upon the outer periphery thereof in which are rigidly secured arms such as 30, and a spreader 31 is attached to the end of each arm. The outer surfaces of the spreader 31 are approximately cylindrical in form and adapted to fit snugly within the interior cylindrical surface 32 of the flange 33. The shaft 26 is prevented from turning within the flange 28 by means of the pin 34 which is driven tightly in holes provided in both. A flange 35, in all respects similar to the flange 33, is provided just within the side 17 and said flange is provided with spreaders, arms, bosses and a flange 36, in all respects similar to the parts numbered, respectively, 31, 30, 29 and 28 with reference to the flange 33, excepting that the flange 36 is provided with a bearing hole which is revolubly mounted upon the portion 37 of the bearing stud 22.

A plurality of shelves such as 38 extends between the flanges 33 and 35 and said shelves are secured thereto in any approved manner.

Upon each of the shelves 38 there is mounted a plurality of stamps such as 39, said stamps being shown only upon one of the shelves in each of the Figs. 1 and 2.

Each of the stamps 39 is provided on its lower surface with a composition such as 40, the lower surface thereof being molded to print as desired. Each of the stamps 39 is provided with a stamp stem 41, and said stamp stem is provided with a hole therethrough which fits freely upon the pin 42 between the ears 43—43 of the fork 44 and said pin is riveted within holes provided in said ears. The fork 44 is riveted upon the front end of the stamp rod 45. The stamp rod 45 slides freely within the stamp tube 46 and a pin 47 is secured in said rod and slides freely in the slot 48 provided in the tube 46, thus preventing disengagement of said rod and tube.

The stamp tube 46 slides freely within holes provided in the guiding ears 49—49 of the stamp guide 50 and said tube is provided at its outer end with a flange 51 formed integrally therewith and at its inner end with a nut 52 threaded thereupon, the purpose of said flange and nut being to prevent disengagement of the tube 46 from the stamp guide 50.

The guiding ears 49—49 of the stamp guide 50 are formed integrally with the bottom 53 and a second pair of bearing ears 54—54.

The bearing ears 54—54 fit loosely between the stamp guide bearing ears 55—55 of the stamp support 56 and the ears 54—54 are provided with holes which fit freely upon the pin 57 and said pin is riveted in holes provided in the ears 55—55.

The ears 55—55 are formed integrally with the sides 58—58 of the stamp support 56 and said sides are formed integrally with the bottom 59 of said stamp support. The bottom 59 is provided with a hole through which passes the screw 60, a washer 61 being interposed between the head of said screw and the bottom 59. The body of the screw 60 passes through the slot 62 which is provided in the shelf 38 and guiding ears 63—63, which are formed of the metal struck out of holes in the sides 58—58, one of which holes is shown at 64 in Fig. 1, extend into the slot 62 and serve to keep the stamp support 56 in the position shown in Fig. 6, when said stamp support is adjusted along the shelf 38, as hereinafter explained. The wing nut 65 threaded upon the lower end of the screw 60 serves to clamp the stamp support 56 into any position into which it may be moved.

The upper end of each of the sides 58—58 is provided with a forwardly extending spring ear 66. Said spring ears are bent toward each other, as shown in Fig. 6, and each of said spring ears is provided with a circular portion 67 adapted to embrace the stamp stem 41. Each of said spring ears is also provided with a front curved end 68 for a purpose hereinafter explained. The lower face of the stamp handle 69 rests upon the upper edges of the circular portions 67—67 and serves to support the stamp 39, as hereinafter explained.

The brackets 70—70, the table 71, the inking pad 72, the guides 73—73, the cover 74, the box-shaped portion 75 for covering the inking pad 72 and the finger grips 76—76 having been fully described and their functions explained in my application for U. S. Letters Patent No. 149126, filed Feb. 16, 1917, will not be further described.

Upon the cover 74, I provide a plurality of horizontal lines, as shown in Fig. 2, the number of said lines being equal to the number of the shelves 38 and each of said lines is designated by a literal placed at the end thereof, said literal corresponding to the literal placed at the ends of each shelf.

I divide the horizontal lines upon the cover 74 into a plurality of vertical series, the number of said series corresponding to the number of stamps that are to be placed upon each shelf, and I designate each series by a numeral, which numerals correspond to the numerals upon the front of the shelves 38.

In order to move each shelf to the position shown as occupied by the shelf marked "A" in Fig. 2, I provide the following instrumentalities:—

A bracket 77 is secured to the end 78 of the table 71 by screws such as 79. The bracket 77 is provided with a horizontal portion 80 in which is formed a plurality of depressions 81, there being one depression 81 for each of the shelves 38 and the literals 82, one of which designates each depression, correspond to the literals placed upon the front of the shelves. The inner end of the bracket 77 is provided with a hole 83 in which is slidably mounted the indexing tube 84.

A collar 85 is rigidly secured to the front end of the tube 84 and said collar is formed integrally with the arm 86, and the latter terminates in the ball handle 87. To the rear end of the tube 84 is secured the collar 88 by means of the screw 89 and said collar is provided with the indexing cam 90.

The sleeve 91 fits loosely over the collar 88 and is provided with a slot 92 to permit of free motion of the index cam 90. The sleeve 91 has a face 93, the latter being provided with a hole which fits freely upon the tube 84. The rack collar 94 fits snugly within the interior of the sleeve 91 and is secured thereto by means of the screw 95. Thus, it will be noted that the collar 88 revolves freely within the sleeve 91 and is kept in position therein by the inside faces of the face 93 and collar 94.

The rack collar 94 is provided with a rearward extension 96 provided with a groove 97 in which is fitted the front end of the rack 98 and said rack is secured therein by means of screws such as 99.

The flange 24 is provided with a pair of guide brackets 100—100 having slots milled therein in which is slidably mounted the rear end of the rack 98. The rack 98 meshes with the gear wheel 101 and the latter fits tightly upon the shaft 26 and is secured thereto by the pin 102. The bracket 103 is secured to the side 18 by screws such as 104 and said bracket supports a pair of bearing pins 105—105 upon which are revolubly mounted the arms 106—106 of the indexing lever 107. Said arms are formed integrally with the cam follower 108, the latter being a flat plate having its outer surface located to be operated upon by the cam 90. A third arm 109 is also formed integrally with the indexing lever 107 and said arm extends upwardly and toward the left midway between the arms 106—106 and is provided at its top with a curved face 110 against which normally rests the head 111 of the indexing pin 112, said head being kept in contact with said curved face by the pressure of the spring 113. The head 111 is mounted to slide freely within a hole provided in the indexing pin guide 114 and the latter is secured to the side 18 by screws such as 115. The indexing pin guide 114 is provided with a slot 124 in which freely slides the end of the arm 109. The inner end of the guide 114 is provided with a hole through which freely slides the body of the pin 112 and the end of said pin is chamfered as at 116.

In order to provide a guide for the front end of the indexing tube 84, I secure the rod 117 in a hole provided in the front end of the bracket 77 by means of the pin 118 and said rod extends rearwardly to about the position shown at 119 in Fig. 4.

In order to provide for stopping the shelves 38, as hereinafter explained, I secure to the flange 33 a plurality of indexing sockets 120 each provided with an indexing hole 121. Said sockets are tightly driven in holes provided in the flange 33 and each socket is provided with a flange having a chamfered portion 122. The holes 121 are made somewhat larger in diameter than the diameter of the indexing pin 112. The socket for the shelf A is at the maximum distance from the center of the shaft 26, and the sockets for the other shelves are each closer thereto than the next preceding socket.

In order to insure that the stamps 39 shall not become inadvertently displaced during the rotation of the flanges 33 and 35, the stamp guard 125 is provided. This stamp guard is shown in Figs. 1 and 2 and it consists of a piece of sheet metal which is bent circular in shape and partially surrounds the flanges 33 and 35 and the shelves 38 supported thereby. The inner end of the stamp guard 125 is secured to the back 20 by screws such as 126 shown in Fig. 1, and the front end of said stamp guard is secured to the inside edge of the table 71 by screws such as 127.

Hence, it is evident that during the rotation of the shelves 38, none of the stamps 39 supported thereby can be displaced outwardly by the force of gravity when said stamps are below a horizontal plane through the center of the bearing stud 22 and shaft 26. It is furthermore evident that when said stamps are above said plane the force of gravity will prevent any displacement thereof.

The operation of my improved stamp rack is as follows:—

The operator makes an inspection of the index mounted on the front cover and ascertains the location where the stamp that he desires to use is indexed; he then notes the literal at the end of the line upon which the stamp is indexed and the numeral at the head of the vertical series in which it is indexed.

The operator then grasps the handle 87 and moves it from the position shown by full lines in Fig. 8, which is its normal or locked position, and turns it in a counter clock-wise direction to the position shown dotted in said figure, in which the arm 86 rests against the stopping rib 123, formed integrally with the bracket 77. During this motion of the handle 87, the cam 90 moves from the position shown dotted in Fig. 3 to the position shown by full lines in said figure and the indexing pin 112 is moved by the spring 113 from the position shown dotted to the position shown by full lines in said figure.

It is evident that when the pin 112 is removed from the socket 120, as just described, the flanges 33 and 35 and the shelves supported thereby will be free to move.

The operator then moves the handle 87 until the arm 86 is over a depression 81, that is, in line with the literal 82 that corresponds to the literal upon the end of the horizontal line upon which the stamp which he desires to use is indexed.

This motion of the handle 87 is communicated to the rack 98 because it is evident from an inspection of Fig. 4 that the collar 88 will either push the collar 94 inwardly or pull the sleeve 91 outwardly, according to the direction in which the handle 87 is moved, and since the sleeve 91 and collar 94 are locked together by the screw 95, it is evident that the rack 98 has the same longitudinal movement as the handle 87.

It is furthermore evident that since the collar 88 works freely within the sleeve 91 and between the inside faces of the face 93 and the collar 94, and also, since clearance is provided by the slot 92 around the cam 90, any motion of revolution communicated to the tube 84 by the handle 87 will not be communicated to the rack 98.

The motion of the arm 87, just described, is communicated by the rack 98 to the gear wheel 101 and turns the latter and the flanges 33 and 35 until the shelf, that corresponds to the literal 82; that is opposite the arm 86, reaches the position shown as occupied by the shelf "A" in Fig. 1.

The operator then moves the handle 87 in a clockwise direction from the position shown by full lines in Figs. 1 and 2 and by dotted lines in Fig. 8 to the position shown by full lines in the latter figure. During this motion of the handle 87, the cam 90 will move from the position shown by full lines in Fig. 3 to the position shown by dotted lines in said figure and move the pin 112 from the position shown by full lines to the position shown by dotted lines, thus introducing the point of said pin within the hole 121 of the socket 120 and locking the shelf in place.

It is to be noted that the chamfer 116 is provided to insure easy entrance of the point 112 within the hole 121.

The operator then applies his hand to the stamp handle 69 and pulls it toward him. This will remove the stamp stem 41 from the circular portion 67 of the stamp support 56. The operator will then continue the forward movement of the stamp handle until the composition 40 is above the stamp pad 72. He will then press the handle 69 downwardly and bring said composition against said pad to ink same.

A further forward movement of the stamp handle 69 will bring the stamp 39 above the object that is to be stamped, which is resting upon the table 71, and a downward pressure of the stamp will stamp the object.

The operator then moves the stamp handle 69 rearwardly and forces it between the front curved ends 68 of the stamp support 56 and allows it to pass within the circular portions 67 and the latter support the composition 40 out of contact with the shelf 38 and will also retain said stamp stem within said curved portions.

It is to be noted that during the forward and rearward movements of the handle 69, the stamp tube 46 slides within the guiding ears 49—49 and that the stamp rod 45 slides freely within the stamp tube 46. It is also to be noted that during the upward and downward motions of the handle 69 the stamp guide 50 revolves freely upon the pin 57.

It is furthermore to be noted that the location of each stamp 39 upon the shelf 38 may be adjusted longitudinally by loosening the nut 65, moving the stamp to the desired position, then tightening said nut.

I claim:—

1. In a stamp rack, the combination with a casing, of flanges revolubly mounted therein, shelves supported by said flanges, a gear wheel connected to one of said flanges, a rack meshing with said gear, a handle connected to said rack, index sockets on one of said flanges and an index pin operated by said handle and coöperating with said sockets to stop said flanges.

2. In a stamp rack, the combination with a casing, of flanges revolubly mounted therein, shelves supported by said flanges, a gear wheel connected to one of said flanges, a rack meshing with said gear, index sockets on one of said flanges, an index pin coöperating with said sockets to lock said flange and a handle connected to said rack and having a translatory movement to operate said rack and a rotatory movement to operate said pin.

3. In a stamp rack, the combination with a casing, of flanges revolubly mounted therein, shelves supported by said flanges, a gear wheel connected to one of said flanges, a rack meshing with said gear, a handle connected to said rack and having a rotatory motion independent of said rack and notches supported by said casing for the reception of said handle at one limit of its rotatory movement.

4. In a stamp rack, the combination with a casing, of flanges revolubly mounted therein, shelves supported by said flanges, a gear wheel connected to one of said flanges, a rack meshing with said gear, a handle connected to said rack and having a rotatory motion independent of said rack, index sockets on one of said flanges, an index pin operated by said handle coöperating with said sockets to lock said flange and a rib supported by said casing for stopping said handle at one limit of its rotatory movement.

5. In a stamp rack, the combination with a casing, of flanges revolubly mounted therein, shelves supported by said flanges, a gear wheel connected to one of said flanges, a rack meshing with said gear, index sockets on one of said flanges, an index pin coöperating with said sockets to lock said flange, a handle connected to said rack and having a translatory movement to operate said rack and a rotatory movement to operate said pin, a lever for moving said pin into said sockets, a spring for removing said pin from said sockets, and a cam connected to said handle for operating said lever.

6. In a stamp rack, the combination of a shelf with a slot therethrough, a stamp support mounted thereon, and a pair of ears on said support sliding in said slot.

7. In a stamp rack, the combination of a shelf, with a stamp support mounted thereon, a pair of circular portions on said stamp support and a stamp stem yieldingly held therein against movement in one direction and rigidly supported thereby against movement in another direction.

8. In a stamp rack, the combination with a stamp support comprising a bottom, a pair of sides, a pair of circular portions, and a pair of curved front portions formed integrally of a stamp guide pivoted to said sides, a stamp rod sliding in said guide, a fork on the end of said rod and a stamp stem pivoted within said fork.

9. In a stamp rack, the combination with shelves and means for revolubly supporting said shelves, of stamps slidably mounted upon said shelves and a stamp guard located to prevent sliding of said stamps except at predetermined positions.

In testimony whereof, I affix my signature.

WILLIAM H. NIEMEYER.

Copies of this patent may be obtained for five cents each, by addressing the "Commissioner of Patents, Washington, D. C."